United States Patent [19]

Orcutt et al.

[11] 4,396,826
[45] Aug. 2, 1983

[54] LIGHTWEIGHT HEATED PLASTIC WINDOW ELEMENT WITH UNIQUE BUS BAR SYSTEM

[75] Inventors: Dee R. Orcutt; David C. Allen, both of Huntsville, Ala.

[73] Assignee: PPG Industries, Inc., Pittsburgh, Pa.

[21] Appl. No.: 292,458

[22] Filed: Aug. 13, 1981

[51] Int. Cl.³ .............................................. H05B 3/06
[52] U.S. Cl. .................................... 219/522; 219/203;
219/541; 219/544; 219/547; 174/68.5;
156/273.9; 244/134 D; 428/38; 428/922;
29/613; 264/272.14
[58] Field of Search ............... 219/203, 522, 541, 543,
219/544, 547; 428/38, 49, 173, 922; 174/68.5;
156/99, 102, 272, 275; 29/611, 613; 244/134 R,
134 D; 264/272

[56] References Cited

U.S. PATENT DOCUMENTS

| | | |
|---|---|---|
| 2,813,960 | 1/1952 | Egle et al. ........................ 219/544 X |
| 3,223,829 | 12/1965 | Davy et al. .......................... 219/522 |
| 3,383,762 | 1/1965 | Leclercq ................................ 29/611 |
| 3,475,595 | 10/1969 | Leclercq .............................. 219/522 |
| 3,781,524 | 12/1973 | Levin ................................... 219/522 |
| 3,947,618 | 3/1976 | Gruss .................................... 428/49 |
| 3,974,359 | 8/1976 | Orcutt et al. ........................ 219/522 |
| 3,982,092 | 9/1976 | Marriott .............................. 219/203 |
| 4,078,107 | 3/1978 | Bitterice et al. ...................... 428/38 |
| 4,209,687 | 6/1980 | Bethge et al. ................... 219/544 X |
| 4,323,726 | 4/1982 | Criss .................................. 174/68.5 |

Primary Examiner—Volodymyr Y. Mayewsky
Attorney, Agent, or Firm—Edward I. Mates

[57] ABSTRACT

A novel solderless connection between a bus bar and an array of electroconductive wires avoids cracks in plastic window elements, particularly the outer component of curved lightweight heated windows, particularly those used in aircraft.

8 Claims, 9 Drawing Figures

LIGHTWEIGHT HEATED PLASTIC WINDOW ELEMENT WITH UNIQUE BUS BAR SYSTEM

BACKGROUND OF THE INVENTION

1. Field of the Invention

The present invention relates to lightweight plastic window elements generally used in aircraft, and particularly those that must be heated to provides means for dissipating fog or frost that forms on a surface of the window. The window usually comprises an outer window element comprising components of an acrylic resin that are fused together to form the element. One or more of the window elements may be a polycarbonate or a polyester. The window may also be provided with an electroconductive circuit that removes static electricity so as to provide a static dissipation circuit. A heating circuit for such a window comprises bus bars that are interconnected by a series of electroconductive wires that form the heating circuit. The wires forming the heating circuit are embedded in the plastic component in an array near its surface. Usually, the plastic component with embedded wires is fuse bonded under pressure with another plastic component to form a windshield element. The fused element may then be laminated under pressure to other windshield elements to form a laminated windshield.

The bus bars of the heating circuit are connected to a source of electrical power through terminal blocks and lead lines. One of the latter is grounded and one or more other lead lines connected to a power source. In the past, the electrical connections between the bus bars and the electroconductive wire of the electroconductive heating circuit were spot soldered. Such soldering required intense localized heating of the substrate which supported the electroconductive circuit and the bus bars. Localized heating caused localized stresses which interfered with the optical properties of the window and also rendered the windows less able to withstand stresses imposed during installation and those resulting from flexing and impacts during use in aircraft. In addition, it was difficult, if not impossible, to control the uniformity of thickness of the spaced solder points between the bus bars and the heating circuit. The thicker solder areas caused stresses that cracked the outer surface of the plastic window during further processing under pressure required for fuse bonding two or more plastic components to form a window element and/or laminating the window element so formed to other window elements.

Windshields with solder connections were failing during service. An examination of these windshields showed that the failure was accompanied by cracks that formed in outwardly facing plies of acrylic plastic in elongated regions overlying the bus bars. Inspection of the bus bar areas indicated thickness variations in the solder connections between the bus bars and the conductor wire because of uneven application of solder.

It is obvious that a technique for local electrical connections between an electroconductive wire heating circuit and a bus bar that avoids the need for spot soldering between the wires and the bus bars at spaced points therealong would be desirable in lightweight windows using heating circuits embedded in a plastic window element.

2. Description of the Prior Art

U.S. Pat. No. 2,813,960 to Egle and Bethge shows a laminated heated window in which heating wires are sewn or embedded in an organic interlayer material such as cellulose derivatives, polyvinyl butyral, polyamides or silicones or in ceramic materials, as well as glass, so that these materials can be generally used in area heating either in transparent or opaque bodies. The heating element is completely embedded in the insulated heating body material and is usually connected to a bus bar by spaced solder connections. The difficulty of controlling uniform solder thickness makes these units subject to the stress problem mentioned previously.

U.S. Pat. No. 3,383,762 to Leclercq discloses a laminated glass-plastic unit incorporating an electroconductive wire matrix embedded in a plastic interlayer. The ends of certain runs of wire are reversely looped around a bus bar. Spaced solder connections are applied to connect the reversely looped ends of the wire to the bus bar. The use of solder causes areas of increased thickness which cause localized stresses that would crack an acrylic plastic window element if the latter were substituted for glass in the Leclercq structure.

U.S. Pat. No. 3,947,618 to Gruss discloses a laminated glass plastic window that has a heating circuit that comprises wires extending between bus bars in random directions. The wires and the bus bars are embedded in a relatively flexible layer of interlayer material and the randomly directed wires have short length portions in the thickness direction as well as those extending parallel to the surfaces of the flexible layer. The wires are bonded between a segmented strip and relatively wide, continuous strip of bus bar material at random points as a result of lamination under pressure.

U.S. Pat. No. 4,078,107 to Bitterice and Keslar discloses a transparent plastic window containing embedded therein a static electricity dissipating circuit connected to a bus bar which leads to a grounded terminal and which may also contain a heating circuit insulated from the static electricity dissipating circuit and connected to a pair of bus bars suitably connected between ground and a source of voltage. The electroconductive wires of the various circuits are connected to the associated bus bars by applying two bus bar elements in the form of layers or strips of bus bar material, one above and one below the wires, and tacking the bus bar elements to one another and to the intermediate wires with a soldering iron. This soldering technique involves localized hot spots which establish very high local stresses. In addition, it is difficult to control uniformity of thickness in the spaced solder connections. The resulting areas of non-uniform thickness at the solder application points cause the plastic window element to develop cracks when the component containing the heating wires in the bus bars is fuse bonded to another component under pressure to form an element of an aircraft window and when the resulting element is laminated under pressure to other elements to complete the window. During service, these cracks developed into breaks and also caused optical and mechanical defects in the window.

SUMMARY OF THE INVENTION

The present invention relates to a lightweight heated plastic window having a unique bus bar system that does not require spaced solder connections between bus bar components. Lead wire is soldered in conventional manner. Each bus bar comprises a pair of bus bar elements adhered together and sandwiching an end portion of a heating wire array. The bus bar is located in an elongated groove that is formed in a surface of a component forming part of an element of a lightweight window. The absence of multiple solder points of non-uniform thickness along the length of the bus bar avoids the establishment of cracks in the plastic resulting from fuse bonding plastic components to form a windshield element, which may be laminated to additional elements using interlayer material or which components may be fuse bonded to form a final monolithic window containing one or more electroconductive circuits comprising electroconductive wirs in electrical contact with one or more special bus bars of the present invention. The bus bars of the present invention comprise adhesively bonded bus bar elements that sandwich the ends of the heating wire array therebetween and are so constructed that soldering is unnecessary to connect the bus bar elements or to complete the bus bar connection to the heating wire array. This alleviates the need for areas of solder of non-uniform thickness which cause the stresses that crack the plastic component of the lightweight window.

The benefits of the present invention will be understood more clearly in the light of a description which follows.

BRIEF DESCRIPTION OF THE DRAWINGS

In the drawings that form part of a description of a preferred embodiment of the present invention and where like reference numbers refer to like structural elements.

DESCRIPTION OF THE PREFERRED EMBODIMENT

Figure 1:
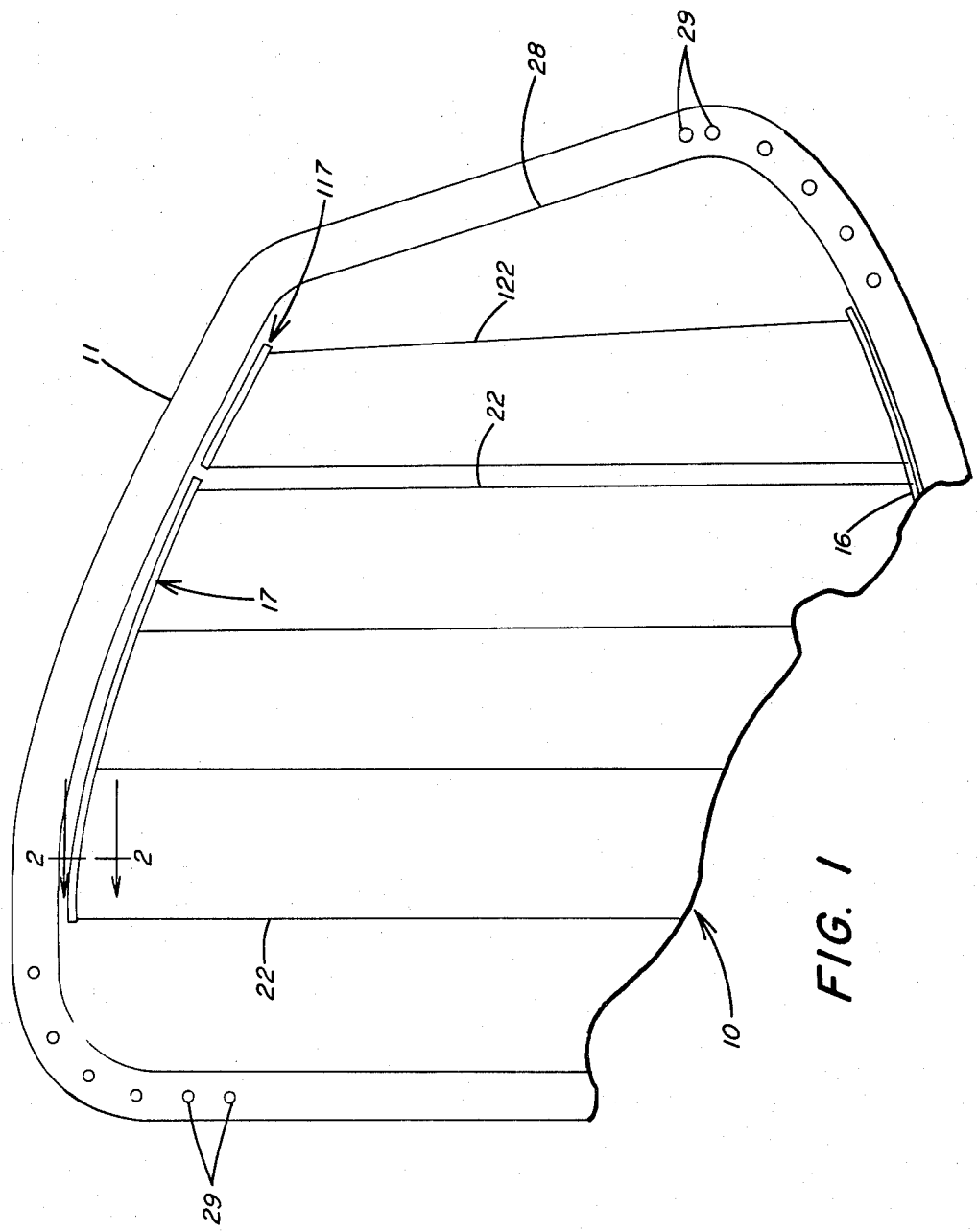
FIG. 1 is a fragmentary plan view of a portion of a typical lightweight laminated window of transparent plastic material modified according to the present invention.
Figure 2:
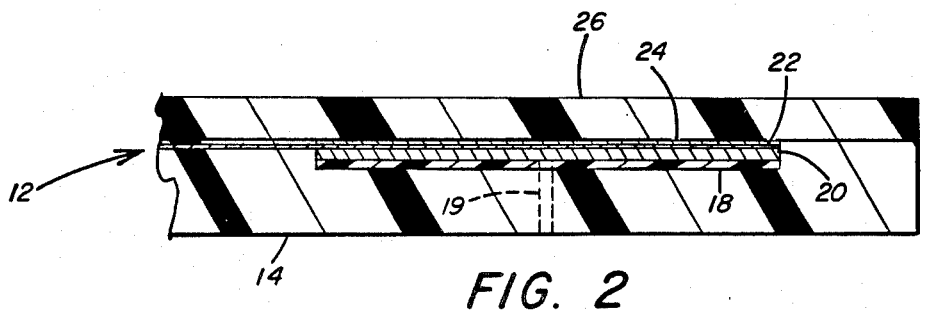
FIG. 2 is a sectional view taken along the line 2—2 of FIG. 1 of a monolithic fuse bonded element forming part of the laminated window depicted in FIG. 1 with an interlayer and additional window elements of a laminated lightweight window omitted.
Figure 3:
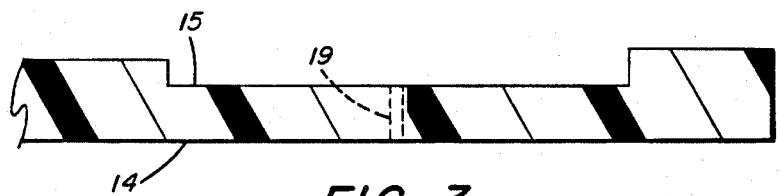
FIG. 3 is a cross-sectional view of a component of the element depicted in FIG. 2 showing how a groove is applied to a windshield component during the first stage of the fabrication of a bus bar conforming to this invention.
Figure 4:
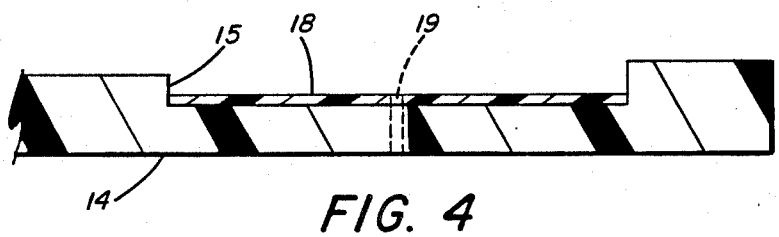
FIG. 4 is a view similar to FIG. 3 showing how the groove is lined with a double back adhesive tape that forms a bed for the bus bar of the present invention and how the groove is prepared to receive a lead wire that connects the bus bar to an electrode.
Figure 5:
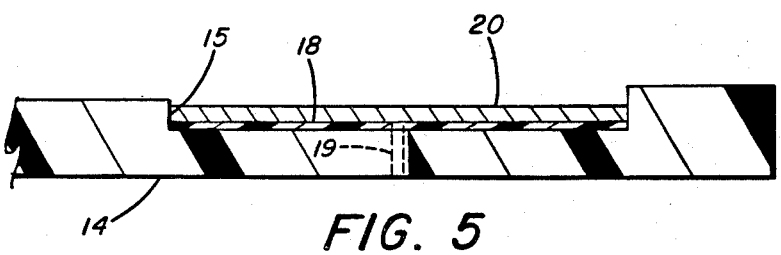
FIG. 5 is a view similar to that of FIG. 4 showing the next stage in the preparation of the bus bar when a first bus bar component is adhered to the bus bar bed.

Referring to the drawings, FIG. 1 shows a schematic plan view of a portion of a laminated window unit 10 containing a window element comprising at least one special bus bar conforming to the present invention. Specifically, the window unit 10 includes an encompassing apertured mounting frame 11 that surrounds an outer window element 12 (see FIG. 2) which comprises a first window component 14 preferably composed of a layer of a plastic material selected from the class consisting of acrylic, polycarbonate, and polyester resins. The first window component is provided with an elongated bus bar groove 15 for each bus bar 16 or 17 or 117 required. The groove is preferably of uniform depth and width along its length, as depicted in FIG. 3.

A bus bar bed 18 preferably of substantially uniform thickness and consisting essentially of a double backed adhesive tape of a polyethylene glycol of terephthalic acid (sold under the trademark MYLAR ®) or the like, such as sold as 3M's 666 tape, is disposed along the bottom of the elongated groove 15. The applied bed 18 is also shown in FIGS. 4 to 9.

At one end of the groove 15, an aperture 19 is provided through the grooved portion of the first window component 14. This aperture also extends through the thickness of an aligned portion of the bus bar bed 18 and receives a lead wire (not shown) that connects the bus bar to a terminal block (not shown).

A first bus bar element 20 consisting essentially of a thin elongated strip of electroconductive ductile metal of substantially uniform thickness, such as a copper bus bar 10 mils (0.025 millimeters) thick, is bonded to the bus bar bed 18. FIGS. 5 to 8 show the first bus bar element 20 over the bus bar bed 18 in adherent relation thereto. A small portion at one end of the bus bar element 20 faces the aperture 19.

Figure 6:
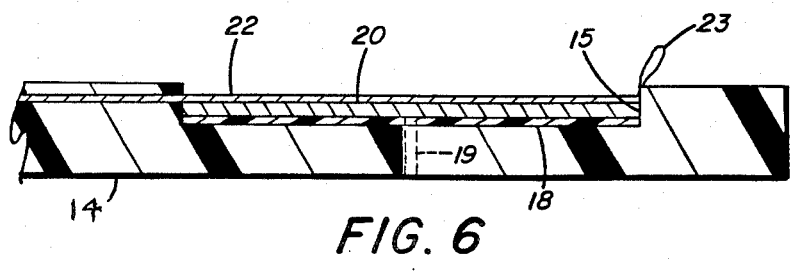
FIG. 6 is a view similar to that of FIG. 5 showing the next stage in the formation of the bus bar wherein the windshield component containing the groove for receipt of the bus bar is modified by embedding an array of electroconductive wires into the windshield component in such a manner that an end portion of the wire array bridges the elongated groove which receives the novel bus bar of this invention.

One or more arrays of electroconductive wire comprising a plurality of electroconductive wires 22 are embedded in a major surface of the first window component 14. The wires have portions extending across the elongated bus bar groove 15 to form reversely looped first end portions 23 beyond the groove 15, as seen in FIG. 6. The wires 22 of the wire array interconnect bus bars 16 and 17, as shown in FIG. 1. If needed, a second array of wires 122 and a second bus bar 117 spaced from bus bar 17 may comprise a second heating circuit with elongated bus bar 16. Separate controls may be provided for the heating circuits, if desired, to control the temperature of different window portions independently.

Figure 7:
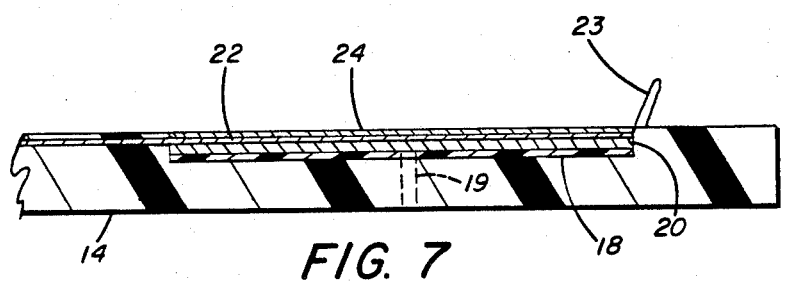
FIG. 7 is a view similar to that of FIG. 6 showing the next stage of the bus bar formation when a second bus bar component consisting essentially of an electroconductive adhesive tape is superimposed over the first bus bar component and the portion of the wire array that bridges the groove to sandwich the wire between the adhered bus bar components.
Figure 8:
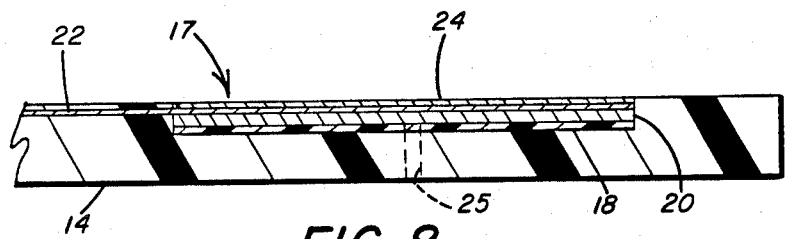
FIG. 8 is a view similar to FIG. 7 showing how the sandwich of FIG. 7 is modified by trimming an excess of the end portion of the electroconductive wire array.
Figure 9:
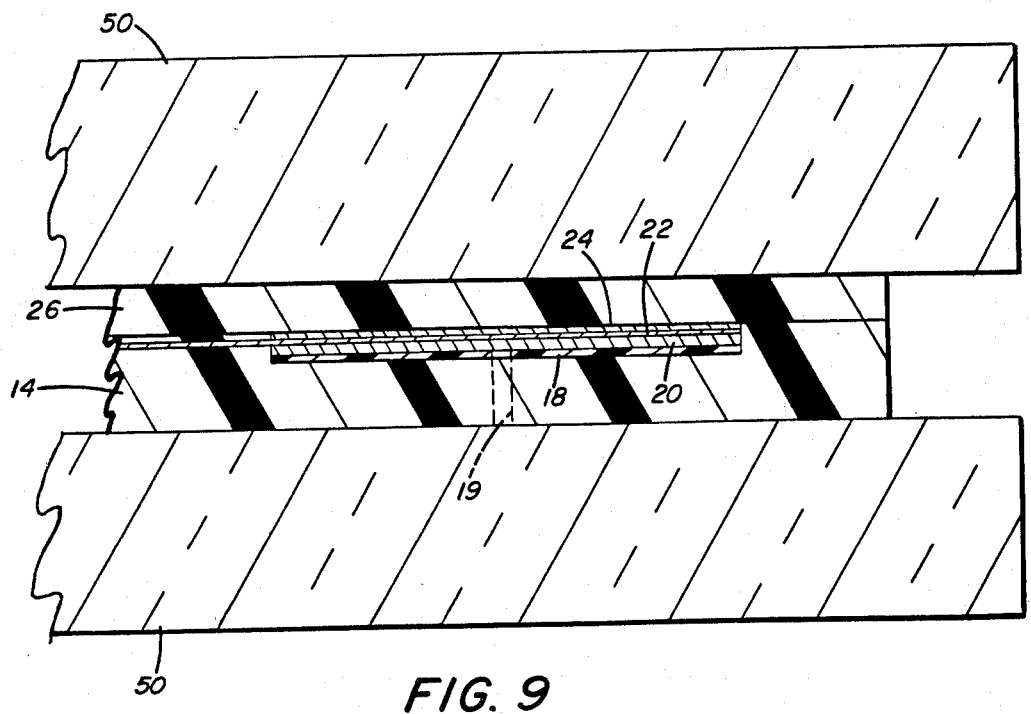
FIG. 9 is a fragmentary sectional view showing a portion of the windshield component of FIG. 8 assembled with a second windshield component between a pair of press polishing plates to show how the press polishing plates fuse bond the windshield components to one another to form a window element while press polishing their outer surfaces.

As seen in FIG. 7, a second bus bar element 24, preferably a copper foil electrical tape with a conductive adhesive, such as 3M electrical tape No. 1181, is superimposed over the bridging portion of the wires 22 and in electroconductive contact with the first bus bar element 20 to sandwich the wires between the elements 20 and 24 of the bus bar. The reversely looped end portions 23 of the wires 22 are then trimmed to complete the fabrication of the bus bar 17 and its connection to one end of the array of wires 22, as shown in FIG. 8. The elongated bus bar 16 is similarly arranged with the opposite end of the array of wires 22, and, if the window unit 10 includes a third bus bar 117, the latter is also treated in a similar manner.

The outer window element 12 also incorporates a second window component 26 also composed of a material selected from the class consisting of acrylic, polycarbonate and polyester resins. The two window components 14 and 26 are fuse bonded in a manner to be described to form the outer window element 12 of the window unit 10.

The window unit, in addition to the outer window element 12, may also include an interlayer composed of a material taken from the class consisting of silicones, polyurethanes and plasticized polyvinyl acetals such as polyvinyl butyral, and another transparent window elements. Neither of the latter are shown because the present invention involves the construction of the special bus bars for the outer window element 12 and the rest of the window elements of the resulting lightweight laminated window unit are of conventional construction.

FIGS. 3 to 9 show the steps of the method of making a special bus bar of this invention and of connecting it to the heating circuit of the outer window element of a lightweight window of a specific embodiment of this invention. FIG. 3 shows a groove 15 of uniform depth of approximately 18 mils (0.5 millimeters) and a uniform width of 0.25 inch (6.4 millimeters) formed in one surface of a sheet of acrylic resin 14 having a thickness of 60 mils (1.5 millimeters). Insertion of a special bus bar 16 or 17 or 117 of substantially uniform width and thickness within the groove while avoiding the use of solder in connecting the bus bars to the wire array of the heating circuit is the gist of this invention. The bed 18 at the bottom of the elongated bus bar groove 15 is 3.5 mils (0.9 millimeters) thick and 0.25 inch (6.4 millimeters) wide of uniform width and thickness. The aperture 19 extends through the grooved portion of the first window component 14 and through the bus bar bed 18 to communicate with the elongated groove 15 near one end thereof.

The first bus bar element 20 is preferably a strip of copper of uniform thickness 10 mils (0.25 millimeters) thick, coextensive in length with the groove 15, and 0.25 inch (6.4 millimeters) wide applied to the bottom surface of groove 15. The wires 22 of the array embedded in the first window component are very thin (about 2 mils or 0.05 millimeters) so as to minimize any variation in thickness along the length of bus bar 16, 17 or 117 along the length of the groove 15.

The second bus bar element 24 applied to the upper surface of the first bus bar element 20 in such a manner that the wires 22 of the array of wires are sandwiched between the first bus bar element 20 and the second bus bar element 24 is preferably a copper foil made adherent by incorporating a conductive adhesive of uniform thickness. A typical material suitable for this purpose is 3M electrical tape No. 1181. The second bus bar element 24 is 3 mils (0.08 millimeters) thick and 0.25 inch (6.4 millimeters) wide superimposed in transversely aligned relation over the first bus bar element 20.

When the bus bar for the window component 14 is made as in FIG. 8, a material that does not bond to said component, such as a silicone rubber plug 25, is inserted in the aperture 19 and a second window component 26 composed of a material taken from the class of materials consisting of acrylic, polycarbonate and polyester resins and 30 mils (0.8 millimeters) thick is applied in face to face relation to the grooved surface of the first window element 14 and sandwiched between a pair of press polishing plates 50 of tempered glass. The assembly of window components is reinforced around its edge and the reinforced assembly inserted within a thin laminating bag used for lamination. The bag and its contents are inserted within another like bag. A particularly suitable bag for lamination is disclosed in U.S. Pat. No. 3,255,567 to Leroy D. Keslar et al.

If desired, the surface of the second window component 14 may be provided with an array of antistatic wire by embedment therein. The antistatic wire may be connected to a grounded terminal block. The resulting assembly is then exposed at atmospheric pressure to an elevated temperature of 250° F. (121° C.) for 45 minutes followed by 200 psi (14 Kg/cm$^2$) pressure at 325° F. (174° C.) for 90 minutes between a pair of pressing plates 50 formed of tempered glass or other highly polished materials followed by gradually reducing the temperature and pressure to room conditions in 90 minutes. The resulting outer window element 12 formed after such fuse bonding at elevated temperature and pressure may be used as a monolithic window by removing the fuse bonded window element 12 from the bag, conforming the window element to the shape of a pair of complementary shaping molds connecting the window element bus bars to wires leading to terminal blocks and checking the window element for electrical continuity.

In order to connect the bus bars to wires leading to terminal blocks, the flat fuse bonded window element 12, upon removal from the bag, is supported with its aperture 19 for each bus bar facing upward. The silicone rubber plug 25 is removed from each aperture 19 and a length of wire inserted into the aperture 19 to a depth sufficient to contact the first bus bar element 20 electrically. The electrical connection is made permanent by applying molten solder into the aperture 19 and allowing the solder to harden while the wire is held in contact with the first bus bar element 20. If any excess solder is applied to the aperture 19, it can be readily removed after overflowing the aperture. The wire inserted into the aperture 19 is connected at its other end to a suitable terminal block. Since the aperture 19 is near the end of the groove 15 which receives a bus bar, the length of the wire can be made as short as practical. Furthermore, the apertures 19 are located in positions where they do not interfere with the vision areas of the window.

Since the single solder connection between the lead wire to the terminal block and the first bus bar element is within the aperture 19 and excess solder can be removed from the vicinity of the aperture without impairing the solder connection within the aperture, the single solder connection between each bus bar and the lead wire of this invention does not result in the non-uniform thickness characteristic of the spaced solder connections between bus bar elements or between the bus bars and the wire array of the prior art. Hence, the single solder connections within the aperture for each bus bar do not cause the localized stresses that induced the stress cracking of prior art structures having spaced solder connections that could not be made more uniform in thickness without harming the solder connections.

The fuse bonded element may form the outer window element of a laminated curved window containing an interlayer of interlayer material such as polyurethane or plasticized polyvinyl acetal, preferably polyvinyl butyral, or a silicone, an inner window element of matched curvature of transparent plastic or glass, and a mounting frame. Such laminated assemblies are disclosed in U.S. Pat. No. 4,078,107 to Michael G. Bitterice et al and may be produced by assembling the fuse bonded outer window element 12, an interlayer, an inner window element, a mounting frame 11 and edge build-up between a pair of tempered glass molds, the contents taped together and inserted within a double thickness of laminating bag similar to that first used for fuse bonding window components to form a window element, and, when assembled for lamination to an interlayer of polyvinyl butyral plasticized with dibutyl sebacate 50 mils (1.3 millimeters) thick and an inner window element of stretched polymethyl methacrylate 312 mils (7.9 millimeters) thick at an autoclave cycle that comprises heating the bag and its contents to 215° F. (102° C.) at a pressure of 75 psi (5.4 Kg/cm$^2$) as rapidly as possible, then raising the pressure to 200 psi (14.3 Kg/cm$^2$) at that temperature for 2 hours, then reducing the temperature and pressure, removing the contents from the bag, inspecting and completing the processing required by the customer.

The additional processing involves routing a continuous, enclosed groove about ¼ inch (6.4 millimeters) wide through the outer window element 12 and a portion only of the interlayer thickness, leaving a frame 11 of acrylic resin separated from the outer window element 12 in spaced relation to the remainder of the outer window element 12 that contains the wire array 22 (and the additional wire array 122, if needed). The shape of the continuous groove is similar to that of the opening in which the laminated window is mounted, only slightly smaller. The laminated window is then routed through its entire thickness to an outline shape slightly larger in extent than said opening. The first enclosed groove is of such a size as to leave a mounting frame 11 about 1 inch (2.54 centimeters) wide laminated via the outer portion of the interlayer to the outer portion of the inner window element and spaced about ¼ inch (6.4 millimeters) from the border of the first window element 12. The inner routed portion of the latter is laminated to the inner portion of the inner window element through the interlayer. A water impervious material such as polysulfide is applied to fill the continuous enclosed groove and form a water barrier 28 therein.

Mounting holes 29 are drilled through the entire thickness of the laminated window including the frame portion outside the continuous groove of the outer window element 12, the peripheral portion of the interlayer and the peripheral portion of the inner window element. The window is now ready for packaging and shipment to an aircraft assembly plant provided it has passed various inspection tests during its fabrication.

The fabrication tests that must be passed at different stages of the fabrication include electrical resistance tests and inspection for broken wires and for the existence of hot spots in the heating circuit after the fuse bonding step, after the step of shaping the fuse bonded element, after the step of laminating the shaped fuse bonded element to the second window element and after the final fabrication steps previously enumerated, optical inspection tests that include transmitting collimated light through the window onto a screen supporting a criss-crossing string board pattern after the aforesaid production steps, checking the window for contour after the shaping step and subsequent production steps, inspecting the window for haze and other optical properties after the various production steps and performing an ice box test wherein the laminated window is chilled to approximately −40° F. (−40° C.) and then heated to operating conditions (approximately 112° F. or 44.4° C.) and finally inspected for its electrical, mechanical and optical properties.

Because the components of the various bus bars 16, 17 and 117 are of uniform thickness, and their total thickness together with the thickness of the bed 18 approximately equals the depth of the elongated groove 15 receiving each bus bar, and the fact that the adhesive forming part of the bed 18 and of the second bus bar element 24 enables the bus bar elements to be bonded along their entire length to one another and to sandwich the bridging portions of the wires 22 between the bus bar elements without the use of solder, it is possible to test the outer window element 12 for the adequacy of its electrical connections between the bus bars before the final lamination step. This early inspection reduces the chance of producing an article that fails to meet customer requirements. Furthermore, the lack of solder connections of non-uniform thickness during the fuse bonding of the window components 14 and 26 to form the outer window element 12 and during the lamination of the outer window element 12 to an inner window element reduces the chance of producing an outer window element that develops surface cracks during its fabrication and/or during its lamination and further fabrication into a window unit, which may result in breakage during use. As a result, the bus bars of the present invention provide good electrical connection between the bus bar elements and the electroconductive wires, the total thickness of the bus bar is more uniform than the prior art and the absence of solder avoids the local regions of increased thickness which caused the problems in fabricating lightweight windows of the prior art. Consequently, the present invention, by making it possible to avoid the application of spaced solder connections along the length of the bus bars, has provided a novel manner of making novel type bus bars for use in lightweight windows while avoiding a major cause of failure in the lightweight windows that include such bars with solder connections to the heating circuit wires.

Test laminated units incorporating bus bars 11 inches (28 centimeters) long constructed according to the present invention separated by 11 inches (28 centimeters) and provided with temperature sensing elements of the type described and claimed in U.S. Pat. No. 3,789,191 to Spindler were subjected to 10,200 cycles during which the square heated area between the bus bars was subjected to 509 watts at 46.9 amperes to heat the area to a temperature of 112° F. (44.4° C.) and the heating cycle repeated when the temperature fell to 110° F. (43.3° C.). At the end of the testing period, the bus bars and their connections were not disturbed and still functioned properly.

A full sized laminated window for a Cessna aircraft was fabricated with three bus bars of the type conforming to the present invention. The windshield was in good operating condition after undergoing all of the tests enumerated previously for window units undergoing production. The bus bars conforming to this invention were adequate for their intended purpose.

The invention shown and described in this disclosure represents an illustrative preferred embodiment thereof. It is understood that various changes may be made without departing from the gist of the invention as defined in the claimed subject matter which follows.

We claim:

1. A lightweight transparent plastic window element comprising a first window component composed of a material selected from the class consisting of acrylic plastics and polycarbonates, an elongated groove having a substantially uniform depth less than the thickness of said first window component extending in one direction along a surface of said first window component, an elongated strip of adherent material of substantially uniform thickness bonded to said elongated groove to form a bus bar bed, a first bus bar element comprising a thin elongated strip of electroconductive, ductile metal of substantially uniform thickness bonded to said elongated strip of adherent material, an array of electroconductive wire embedded in the grooved surface of said substrate and having first end portions extending across said elongated groove in contact with said first bus bar element, and a second bus bar element comprising a metal foil adhesive electrical tape of substantially uniform thickness superimposed over said first end portions of said wire array and bonded to said thin elongated strip of metal to provide a bus bar structure of substantially uniform thickness having a total thickness including the thickness of said bus bar bed approximately equal to the substantially uniform depth of said elongated groove and in electrical contact with said wire array free of spaced solder connections therebetween and a lead wire electrically connected to said bus bar structure.

2. A lightweight transparent plastic window element as in claim 1, further including a second elongated groove extending along said surface in spaced relation to said first groove, said second groove having a substantially uniform depth less than the thickness of said first window component, an elongated strip of adherent material of substantially uniform thickness bonded to said second elongated groove to form a second bus bar, a first bus bar element for said second elongated groove comprising a thin, elongated second strip of electroconductive ductile metal of substantially uniform thickness bonded to said elongated strip of adherent material, said wire array having second end portions extending across said second elongated groove in contact with said first bus bar element within said second elongated groove, and a second bus bar element for said second elongated groove comprising a metal foil electrical tape of substantially uniform thickness superimposed over said second end portions of said wire array and bonded to said thin, elongated, second strip of metal to provide a second bus bar structure having a substantially uniform total thickness including the thickness of said second bus bar bed approximately equal to the substantially uniform depth of said second elongated groove and in electrical contact with said wire array free of spaced solder connections therebetween.

3. A lightweight transparent window element as in claim 1 or claim 2, further includes an aperture extending through said bus bar bed and said component into said groove and said lead wire extending through said aperture.

4. A lightweight transparent window element as in claim 1 or claim 2, further including a window component composed of a material selected from the class consisting of acrylic plastics and polycarbonates fuse bonded to the grooved surface of said first named window component.

5. A lightweight transparent window comprising a window element as in claim 4, further including a layer of interlayer material selected from the class consisting of silicones, polyurethanes and plasticized polyvinyl acetal bonded against the major surface opposite the grooved surface of said first window component and a third window component selected from the class consisting of glass, polycarbonates and acrylic plastics bonded to said layer of interlayer material.

6. A lightweight transparent window element as in claim 4, further including an aperture extending through said bus bar bed and said component into said groove, said lead wire extending through said aperture.

7. A method of making an electroconductive, lightweight transparent window element comprising applying an elongated groove of sustantially uniform depth across a major surface of a first window component composed of a material selected from the class consisting of acrylic plastics and polycarbonates, applying an elongated strip of adherent material of substantially uniform thickness to said elongated groove to form a bus bar bed, applying a first bus bar element comprising a thin elongated strip of electroconductive, ductile metal of substantially uniform thickness to said strip of adherent material, embedding an array of electroconductive wires in said grooved major surface of said substrate so that first end portions of said wire array extend across said elongated groove, mounting a second bus bar element comprising a thin, metal foil adhesive electrical tape whose thickness combined with the thicknesses of said bus bar bed and said first bus bar element is approximately equal to the depth of said groove in superimposed adherent relation to said first bus bar element with said first end portions of said wire array sandwiched between said first bus bar element and said second bus bar element, trimming any excess wire from said array beyond said groove, assembling a second window component composed of a material selected from the class consisting of acrylic plastics and polycarbonates against the grooved surface of said first substrate, and fuse bonding said components under sufficient heat and pressure to form said element.

8. A method as in claim 7, further including making an aperture into said groove through said first window component and said bus bar bed, plugging said aperture with a material that does not bond to said first window component at the heat and pressure of fuse bonding during said fuse bonding step, unplugging said aperture after said fuse bonding step, inserting a wire through said aperture to contact said first bus bar element electrically and making an electrical connection between said wire and said bus bar element.

* * * * *